United States Patent [19]

Fischer

[11] 4,416,561

[45] Nov. 22, 1983

[54] MOUNTING ARRANGEMENT

[76] Inventor: Artur Fischer, Weinhalde 34, 7244 Waldachtal 3/Tumlingen, Fed. Rep. of Germany

[21] Appl. No.: 260,284

[22] Filed: May 4, 1981

[30] Foreign Application Priority Data

May 9, 1980 [DE] Fed. Rep. of Germany ....... 3017749

[51] Int. Cl.³ ............................................ F16B 23/00
[52] U.S. Cl. ........................................ 403/8; 403/10;
248/205 B; 411/427; 4/643
[58] Field of Search ................. 403/6, 7, 8, 10; 4/643,
4/645, 647; 248/205 B, 544; 74/417; 411/427

[56] References Cited

U.S. PATENT DOCUMENTS

| | | | |
|---|---|---|---|
| 1,048,096 | 12/1912 | Ray | 403/8 |
| 1,406,426 | 2/1922 | Stewart | 4/645 |
| 2,275,280 | 3/1942 | Belden | 411/116 X |
| 3,675,312 | 7/1972 | Herman | 403/8 X |

Primary Examiner—Andrew V. Kundrat
Assistant Examiner—Joseph A. Fischetti
Attorney, Agent, or Firm—Michael J. Striker

[57] ABSTRACT

A mounting arrangement for mounting a sanitary object with wider and narrower adjoining cutouts and an opening with the axis extending substantially normal to the axes of the cutouts, has a bolt member anchorable in the wall on which the sanitary object is to be mounted, a nut member having a wider portion substantially corresponding to the wider cutout of the sanitary object and a narrower portion substantially corresponding to the narrower cutout of the object, and being screwable onto the bolt member so as to fix the object between the nut member and the wall, and an actuating member arranged to extend through the opening of the sanitary object and to engage the nut member and to be supported by the latter so as to screw the nut member onto the bolt member and to thereby fix the object.

13 Claims, 3 Drawing Figures

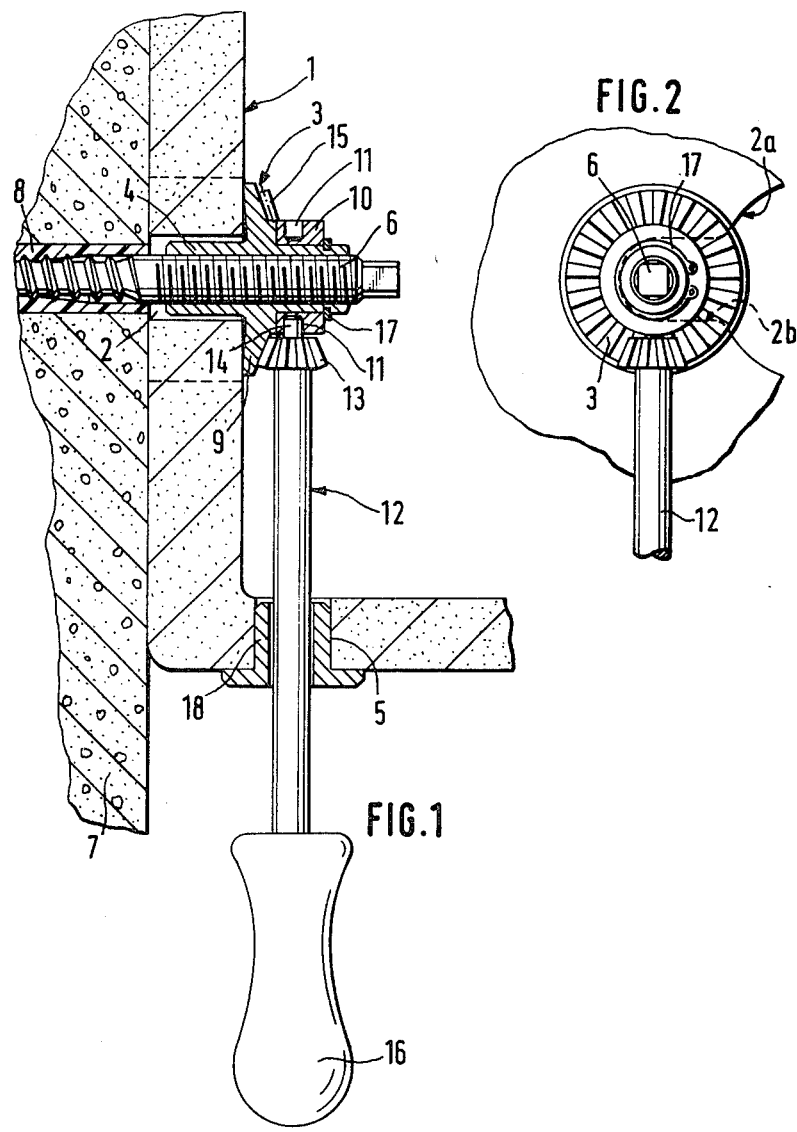

MOUNTING ARRANGEMENT

BACKGROUND OF THE INVENTION

The present invention relates to a mounting arrangement for mounting a sanitary object to a supporting wall.

Mounting arrangements of the above mentioned general type are known in the art. One such mounting arrangement has a collar nut and a stud screw having two threaded sections, of which one threaded section engages in a dowel inserted in a supporting wall so as to be anchored therein and the other threaded section carries the collar nut for mounting a sanitary object having a cut-out in a portion to be mounted and an opening having an axis which extends normal to the axis of the cut-out. For mounting of sanitary objects with the aid of a collar nut, it is required that the collar nut be accessible from outside for tightening by a wrench. This purpose can be achieved in the known mounting arrangement by provision of mounting points in dents in the outer contour of the sanitary object. For aesthetic reasons, however, it is necessary to provide such a mounting which does not require any means undesirably affecting the outer appearance of the sanitary object and not visible from outside. Furthermore, the mounting must be releasable so as to make possible exchange of damaged objects.

SUMMARY OF THE INVENTION

Accordingly, it is an object of the present invention to provide a mounting arrangement which satisfies the above mentioned requirements.

In keeping with these objects, and with others which will become apparent hereinafter, one feature of the present invention resides, briefly stated, in a mounting arrangement having a bolt member anchorable in a supporting wall, a nut member screwable onto the bolt member, and means for screwing the nut member onto the bolt member so as to fix the object, wherein the nut member has a wider portion which at most corresponds to a wider cut-out of the sanitary object, and a narrower portion which substantially corresponds to an adjoining narrower cut-out of the object.

When the arrangement is designed in accordance with the present invention, no element which undesirably affects the outer appearance of the sanitary object, with the exception of the opening for the actuating member, is provided in the arrangement. The mounting arrangement is actually located inside the hollow of the sanitary object and cannot be seen from outside.

The actuating member may be formed as a gear engaging with a toothed rim of the collar nut. The bolt member has one threaded section engageable in a dowel inserted in the supporting wall, and another threaded section carrying the collar nut.

In accordance with another feature of the present invention, the actuating member has a portion extending outwardly beyond the sanitary object and provided with gripping means such a crank, handle or the like. The actuating member may be formed as a spur gear or bevel gear. In this construction the torque required for tightening of the collar nut can be applied in a very simple manner.

Finally, in accordance with a further feature of the present invention, the screw nut is provided with a sleeve mounted axially immovable and rotatable on the same and having a plurality of bearing holes or bearing projections arranged in a star-like manner. The axes of the bearing holes or projections intersect the axis of the stud screw. These bearing holes or projections engage with the respective formations provided on the actuating member.

The novel features which are considered characteristic for the present invention are set forth in particular in the appended claims. The invention itself, however, both as to its construction and its method of operation, together with additional objects and advantages thereof, will be best understood from the following description of preferred embodiments when read in connection with the accompanying drawing.

BRIEF DESCRIPTION OF THE DRAWING

FIG. 1 is a view showing an arrangement for mounting a sanitary object to a wall, in accordance with the present invention;

FIG. 2 is a front view of the mounting arrangement of FIG. 1 and

DESCRIPTION OF THE PREFERRED EMBODIMENTS

Figure 3:
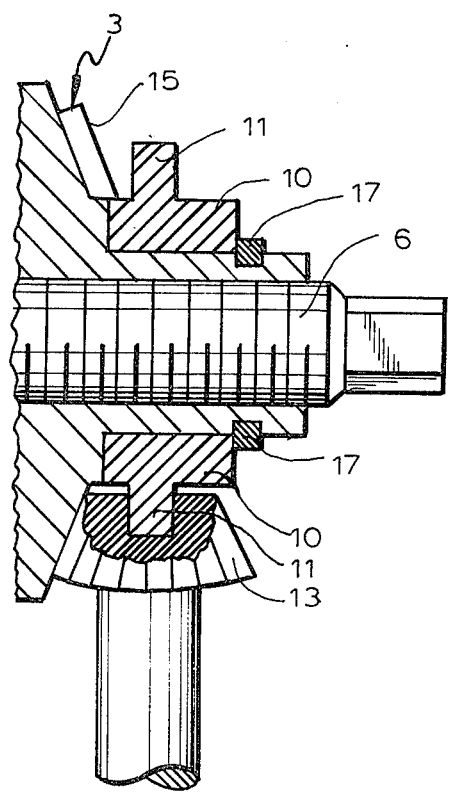
FIG. 3 is a view showing another embodiment of the invention.

A hollow sanitary object 1 is to be mounted on a supporting wall 7 and has a mounting part which is provided with at least one cut-out 2 having two portions 2a and 2b. The portion 2a of the cut-out 2 is wider, whereas the portion 2b of the same is narrower.

A collar nut 3 for fixing the sanitary object 1 to the supporting wall 7 is further provided. The collar nut 3 has a collar with a diameter which is somewhat smaller than the dimension of the wider portion 2a of the cut-out 2 in the sanitary object 1. The collar nut 3 also has a shaft which is identified by reference numeral 4 and has a diameter which is somewhat smaller than the dimension of the smaller portion 2b of the cut-out 2 in the sanitary object 1.

The sanitary object 1 has an outer wall having an opening 5 with an axis extending substantially normal to the axis of the cut-out 2. A sleeve 10 is mounted on the collar nut 3 so that it cannot displace in an axial direction but it can rotate in a circumferential direction relative to the collar nut 3. The collar 10 is provided with a plurality of bearing locations identified by reference numeral 11 and formed as holes. The holes are arranged on a circumferential surface of the sleeve 10 and extend radially so that their axes intersect the axis of the stud bolt 6. The collar 9 of the collar nut 3 is provided with a toothed rim 15.

An actuating member or tool is identified in toto by reference numeral 12 and is driven through the opening 5 which has a diameter corresponding to the diameter of a gear 13 provided at the end of the tool 12. The gear 13 is enagageable with the toothed rim 15 of the collar nut 3. The tool 12 has a bearing projection 14 alternately engageable in a responsive one of the bearing openings 11 of the sleeve 10, as shown in FIG. 1. The sleeve 10 is retained on the collar nut 3 with the aid of a spring ring 17 so that it cannot move in an axial direction relative to the collar nut 3. This guarantees the engagement of the bearing projection 14 of the tool 12 into the bearing holes 11 of the sleeve 10. At the same time, the sleeve 10 can rotate relative to the collar nut 3.

The mounting arrangement in accordance with the present invention operates in the following manner:

The stud screw 6 is anchored in the wall 7 with the aid of the dowel 8 and extends outwardly beyond the wall with its threaded section. The collar nut 3 is screwed onto the stud screw 6 so that the distance between the collar 9 of the collar nut 3 and the outer surface of the wall 7 is somewhat greater than the thickness of the mounting wall of the sanitary object 1. At the same time, the sleeve 10 arranged on the cylindrical portion of the collar nut 3 is so turned that the axis of one bearing hole 11 of the sleeve 10 is aligned with the opening 5 of the outer wall of the sanitary object 1. Then the sanitary object 1 is fitted over the collar 9 of the collar nut 3 by its wider cut-out 2a and shifted so that the narrower cut-out 2b surrounds the shaft 4 of the collar nut 3. The tool 12 is driven through the opening 5 so that its bearing projection 14 engages in one of the bearing holes 11 of the sleeve 10. At the same time, the gear 13 of the tool 12 engages with the toothed rim 15 of the collar nut 3. The tool 12 has a handle 16 which is turned by a user whereby the tool 12 turns and transmits a torque to the collar nut 3. The collar nut 3 displaces in the axial direction on the stud bolt 6 and tightens the sanitary object 1. Since the sleeve 10 is axially fixed by the spring ring 17 on the cylindrical part of the collar nut 3, the sleeve 10 follows the axial displacement of the collar screw during the tightening process. Thereby, the engagement of the teeth of the gear 13 of the tool 12 and the toothed rim 15 of the collar nut 3 during the screwing step is guaranteed. The force component acting in a circumferential direction is taken up by the abutment of the tool shaft against the opening 5. Since the sleeve 10 is rotatable relative to the collar nut 3, the collar nut 3 can rotate whereas the sleeve 10 is prevented from rotation by the tool 12. The provision of several bearing holes 11 on the sleeve 10 makes easier the alignment of the holes 11 in the event that the sleeve 10 is unintentionally turned on the collar nut 3.

While the gear 13 of the tool member 12 is shown as a bevel gear, also a spur gear and the like can be provided. While the supporting means for supporting the tool 12 on the collar nut 3 is formed as the bearing holes 11 provided in the sleeve 10 and the projection 14 provided on the tool 12, this means can be formed differently: for example, a plurality of bearing projections 11 can be provided on the sleeve 10 whereas the bearing hole 14 can be formed in the tool 12 for engagement of the projections therein as shown in FIG. 3.

For mounting of heavier sanitary objects, two mounting points may be utilized. After termination of the mounting process, the tool 12 is withdrawn through the opening 5 and the latter is closed by a cap. For improving the support of the tool shaft in the opening 5 of the outer wall of the sanitary object, another sleeve 18 may be fitted on the tool shaft. The sleeve 18 can be shifted into the opening 5 of the sanitary object after application of the tool 12.

It will be understood that each of the elements described above, or two or more together, may also find a useful application in other types of constructions differing from the types described above.

While the invention has been illustrated and described as embodied in a mounting arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting arrangement for mounting a sanitary object having wider and narrower adjoining cut-outs and an opening with the axis of the opening extending substantially normal to the axes of the cut-outs, to a supporting wall, the arrangement comprising a bolt member anchorable in the wall on which the sanitary object is to be mounted; a nut member having a wider portion substantially corresponding to the wider cut-out of the sanitary object and a narrower portion substantially corresponding to the narrower cut-out of the object, said nut member being formed as a collar nut having a collar which forms said wider portion and a shaft which forms said narrower portion, said nut member being screwable onto said bolt member so as to fix the object between said nut member and the wall; and means for screwing said nut member onto said bolt member for fixing the object, said screwing means including an actuating member arranged to extend through the opening of the sanitary object and to engage said nut member and to be supported by the latter so as to screw said nut member onto said bolt member and to thereby fix the object.

2. An arrangement as defined in claim 1, wherein said actuating member is provided with grasping means for grasping the same by a user during screwing said nut member by said actuating member.

3. An arrangement as defined in claim 2, wherein said actuating member has an outer section arranged to extend outwardly beyond the opening of the sanitary object, said grasping means including a handle provided on said outer section of said actuating means.

4. A mounting arrangement for mounting a sanitary object having wider and narrower adjoining cut-outs and an opening with the axis of the opening extending substantially normal to the axes of the cut-outs, to a supporting wall, the arrangement comprising a bolt member anchorable in the wall on which the sanitary object is to be mounted; a nut member having a wider portion substantially corresponding to the wider cut-out of the sanitary object and a narrower portion substantially corresponding to the narrower cut-out of the object, said nut member being screwable onto said bolt member so as to fix the object between said nut member and the wall; means for screwing said nut member onto said bolt member for fixing the object, said screwing means including an actuating member arranged to extend through the opening of the sanitary object and to engage said nut member and to be supported by the latter so as to screw said nut member onto said bolt member and to thereby fix the object; and means for engaging said actuating member with said nut member so as to screw the latter onto said bolt member, said engaging means including a gear rim provided on said nut member, and a gear part provided on said actuating member and engageable with said gear rim of said nut member.

5. An arrangement as defined in claim 4, wherein said gear part of said actuating member is formed as a spur gear.

6. An arrangement as defined in claim 4, wherein said gear part of said actuating member is formed as a bevel gear.

7. A mounting arrangement for mounting a sanitary object having wider and narrower adjoining cut-outs and an opening with the axis of the opening extending substantially normal to the axes of the cut-outs, to a supporting wall, the arrangement comprising a bolt member anchorable in the wall on which the sanitary object is to be mounted; a nut member having a wider portion substantially corresponding to the wider cut-out of the sanitary object and a narrower portion substantially corresponding to the narrower cut-out of the object, said nut member being screwable onto said bolt member so as to fix the object between said nut member and the wall; means for screwing said nut member onto said bolt member for fixing the object, said screwing means including an actuating member arranged to extend through the opening of the sanitary object and to engage said nut member and to be supported by the latter so as to screw said nut member onto said bolt member and to thereby fix the object; and means for supporting said actuating member on said nut member during screwing of the latter, said supporting means including a sleeve arranged on said nut member axially immovable and rotatable relative to the latter and supporting said actuating member.

8. An arrangement as defined in claim 7, wherein said sleeve has a plurality of first formations, said actuating member having a second formation which is alternately engageable with each of said first formations so as to support said actuating member on said nut member.

9. An arrangement as defined in claim 8, wherein said first formations of said sleeve are holes, said second formation of said actuating member being a projection alternately engageable in said holes.

10. An arrangement as defined in claim 8, wherein said first formations of said sleeve are projections, said second formation of said actuating member being a hole into which said projections alternately engage.

11. An arrangement as defined in claim 8, wherein said bolt member has an axis, said sleeve having a circumferential surface provided with said first formations so that the latter extend substantially radially and have axes intersecting the axis of said bolt member.

12. A mounting arrangement for mounting a sanitary object having wider and narrower adjoining cut-outs and an opening with the axis of the opening extending substantially normal to the axes of the cut-outs, to a supporting wall, the arrangement comprising a dowel insertable into the wall; a stud bolt having one threaded section engaging in said dowel and thereby anchored in the wall, and another threaded section; a collar nut screwable onto the other threaded section of said stud bolt and having a wider part which at most corresponds to the wider cut-out of the sanitary object, said collar nut being provided with a toothed rim; a gear member arranged to extend through the opening in the sanitary object and engaging with said toothed rim of said collar nut; and a sleeve arranged on said collar nut axially immovable and rotatable relative to the latter, said gear member being supported on said sleeve.

13. A mounting arrangement for mounting a sanitary object having wider and narrower adjoining cut-outs and an opening with the axis of the opening extending substantially normal to the axes of the cut-outs, to a supporting wall, the arrangement comprising a bolt member anchorable in the wall on which the sanitary object is to be mounted; a nut member having a wider portion substantially corresponding to the wider cut-out of the sanitary object and a narrower portion substantially corresponding to the narrower cut-out of the object, said nut member being screwable onto said bolt member so as to fix the object between said nut member and the wall; means for screwing said nut member onto said bolt member for fixing the object, said screwing means including an actuating member arranged to extend through the opening of the sanitary object and to engage said nut member and to be supported by the latter so as to screw said nut member onto said bolt member and to thereby fix the object; and means for anchoring said bolt member in the wall, said anchoring means including a dowel insertable into the wall, and a first threaded section of said bolt member screwable into said dowel, said bolt member also having a second threaded section onto which said nut member is screwable.

* * * * *